United States Patent [19]
Coenen et al.

[11] Patent Number: 5,263,734
[45] Date of Patent: Nov. 23, 1993

[54] COUPLING DEVICE FOR ATTACHING TOWABLE IMPLEMENTS TO A TRACTOR

[75] Inventors: Herbert Coenen, Hennef; Hans J. Langen, Frechen, both of Fed. Rep. of Germany

[73] Assignee: Jean Walterscheid GmbH, Lohmar, Fed. Rep. of Germany

[21] Appl. No.: 901,116

[22] Filed: Jun. 19, 1992

[30] Foreign Application Priority Data

Jun. 19, 1991 [DE] Fed. Rep. of Germany ....... 4120119

[51] Int. Cl.⁵ .............................................. B60D 1/36
[52] U.S. Cl. ............................ 280/479.1; 280/479.3; 280/508
[58] Field of Search ............... 280/479.1, 479.2, 479.3, 280/478.1, 508; 172/272; 414/563

[56] References Cited

U.S. PATENT DOCUMENTS

| | | | |
|---|---|---|---|
| 3,391,948 | 7/1968 | McCown | 280/407 |
| 3,521,908 | 7/1970 | Carter | 280/249 |
| 4,360,216 | 11/1982 | Wiemers | 280/479 R |
| 4,482,166 | 11/1984 | Van Antwerp | 280/479.1 |
| 4,575,112 | 3/1986 | Tremblay | 280/479.1 |

FOREIGN PATENT DOCUMENTS

| | | |
|---|---|---|
| 0277103 | 8/1988 | European Pat. Off. . |
| 0308271 | 3/1989 | European Pat. Off. . |
| 1245757 | 7/1967 | Fed. Rep. of Germany . |
| 1943907 | 4/1972 | Fed. Rep. of Germany . |
| 2646068 | 4/1978 | Fed. Rep. of Germany . |
| 8807849 | 10/1988 | Fed. Rep. of Germany . |
| 1030437 | 5/1966 | United Kingdom ............. 280/479.1 |
| 2210009 | 6/1989 | United Kingdom ............. 280/479.2 |

Primary Examiner—Margaret A. Focarino
Assistant Examiner—C. Mattix
Attorney, Agent, or Firm—Harness, Dickey & Pierce

[57] ABSTRACT

A coupling device for a tractor has a frame (4) which is mounted on the rear underside (3) of the tractor (1). A drawbar (14), with a coupling member (15), is guided in the frame (4). The drawbar (14) is moved by a slide (18) and can be swung sideways about a vertical axis. Centering pieces (34) and stop blocks with centering faces (35) and stop faces (38) engage one another to laterally align and fix the drawbar (14). In a lower position the drawbar facilitates lateral swivelling movement about the connecting pin (22). In an upper towing position the drawbar (14) is laterally fixed by the centering pieces (34) and the stop blocks (38). This results in improved control of the coupling members associated with the to be towed implement through lateral alignment of the drawbar and its automatic transfer into its centered position.

19 Claims, 12 Drawing Sheets

COUPLING DEVICE FOR ATTACHING TOWABLE IMPLEMENTS TO A TRACTOR

BACKGROUND OF THE INVENTION

The present invention relates to a coupling device to attach a trailer or any other towable implement to a tractor. The device includes a drawbar mounted under the tail section of the tractor. The drawbar is lowerable, downwardly, out of its towing position and has a coupling member on its rearwardly projecting end.

A known coupling device is illustrated by GB-A-1225761. Here, a drawbar has a coupling member supported laterally by connecting pins. Tiltable framework supports the drawbar, however, the laterally rigid attachment of the drawbar relative to the framework makes coupling difficult.

An object of the present invention is to provide a coupling device which facilitates coupling of a towable implement or trailer to a tractor.

In accordance with one aspect of the invention, a coupling device is mountable on a tractor to releasably connect a towable member to the tractor. The device includes a drawbar movable, in use, relative to the tractor, on which the coupling device is mounted, between a lower inoperative position in which the towable member is connectable to and disconnectable from the drawbar and an upper operative position in which the towable member is towable by the tractor. The device further includes a centering means with abutment members. When the drawbar is in its upper operative position, the abutment members are engageable in contact with one another to center the drawbar relative to the device. When the drawbar is in its lower inoperative position, the abutment members are disengaged from contact with one another.

An advantage of the arrangement described in the preceding paragraph is that it is possible to adjust the drawbar laterally in order to attach a towable implement or trailer to the tractor. Thus, the operator need not perform any further manual operation to release the drawbar in a lateral direction other than the normal lowering operation of the drawbar.

The invention proposes that by raising the drawbar, the abutment members, with the centering means, are brought into engagement with one another thus effecting the desired alignment. The raising movement transfers the drawbar into its aligned position. Also, it is possible for the abutment members, with the centering means, to be brought into engagement with one another through a separate power drive associated with the drawbar. In such an embodiment, the lifting movement to bring the drawbar into its raised towing position and the movement of the drawbar into its centered position occur separately from one another. Such movements may however take place simultaneously.

In one embodiment of the invention, the drawbar is supported on a framework. The drawbar has one or more centering faces for lateral alignment in relation to the framework. When the framework, mounted on the rear underside of the tractor, is lowered the centering faces are brought out of engagement with butting faces on the framework. When the drawbar is raised to the towing position, the faces are brought into engagement. Thus, when the towing position is adopted the drawbar is in alignment. Also, the centering faces may be on separate centering pieces which are detachably secured to the drawbar.

The centering means can alternatively include attachments fixed to the underside of the tractor. In such an arrangement, the drawbar is provided with one or more lateral alignment centering faces. The centering means is fixed on the rear underside of the tractor laterally aligning the drawbar when it is in its towing position. The drawbar can be supported on framework which is secured on the rear underside of the tractor in such a manner that it can be raised and lowered relative to the tractor.

In order to be able to alter the position of the coupling member, the drawbar is mounted on slide means. The slide means is guided so that it can move axially on the framework. Thus, the drawbar can rotate about a vertical axis.

Various means can be employed for mounting the framework to the rear underside of the tractor. If the coupling member is to remain at about the same distance from the rear of the tractor during lowering and raising of the drawbar, the framework may be connected to the underside of the rear of the tractor at the end remote from the implement to be towed so that the framework may pivot about a horizontal axis. If the coupling member is to be extended to any great degree towards the to be attached implement, the framework is connected to the rear underside of the tractor by varying length links.

The slide means is preferably force-guided so that, in a simple mechanical manner, the position of the coupling member relative to the rear of the tractor remains largely constant during the raising and lowering operation. Thus, the direction of the longitudinal axis of the tractor is not altered relative to the coupling member. In order to achieve the forced movement of the slide means, it is connected, via links, to a swivel bearing which is fixed in relation to the tractor.

In order to achieve a constant position of the coupling member in relation to the rear of the tractor, in the case of a swivel bearing, the swivel bearing is positioned closer to the rearward projecting coupling member than the linkage point of the links on the slide means to the coupling member. In the case of a bearing block, the bearing carrying the framework is offset forward from the linkage point of the links on the slide means in the direction of the longitudinal axis of the tractor.

In order to facilitate centering and guidance of the drawbar into its locked position, i.e. its laterally immovable position in the towing position, the centering faces of the drawbar, in a direction starting from the towing position in which they are supported laterally between the butting faces, are designed to converge towards the front in the direction of the longitudinal axis of the tractor. The guide cross-section of the centering pieces thus becomes smaller and allows lateral play towards the stop blocks and therefore a slow convergence during the coupling operation.

To lock the framework in the upper towing position, it is further proposed to provide a locking mechanism which secures the framework in relation to the tractor.

The drawbar can be fitted at each of its ends with differing coupling members to accommodate various types of towable members. The coupling members are circumferentially offset in relation to one another about the longitudinal axis of the drawbar. The coupling members in the towing position have a cross-section which is smaller than the opening cross-section of the framework in the region of the stop blocks. Thus, it is possible by simply removing the drawbar and changing the centering pieces to attach another type of attachment. Also, extension fins may be on the centering pieces in order to facilitate coupling and aligning of the drawbar in a lateral direction in relation to coupling members associated with the to be attached implement or trailer.

Instead of the forced guidance of the slide means via links it may be possible to move the slide means by a power drive. In this case, the raising and lowering movement of the drawbar may be effected separately from its displacement.

In the case of a fixed centering means, the centering means, in a first alternative, includes a swivelling centering lever which rests on the centering faces of the drawbar. Alternatively, the fixed centering device may include a centering fork secured to the rear underside of the tractor. The fork has a supporting recess for the drawbar which opens into obliquely extending faces.

Furthermore, the framework is able to be lifted and lowered by means of a power drive engaged with the framework. Such a power drive can be the lifting drive of the tractor, which is provided for the conventional lower guide linkage, or a separate lifting device may be provided, for example a piston and cylinder unit may be provided on the framework.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
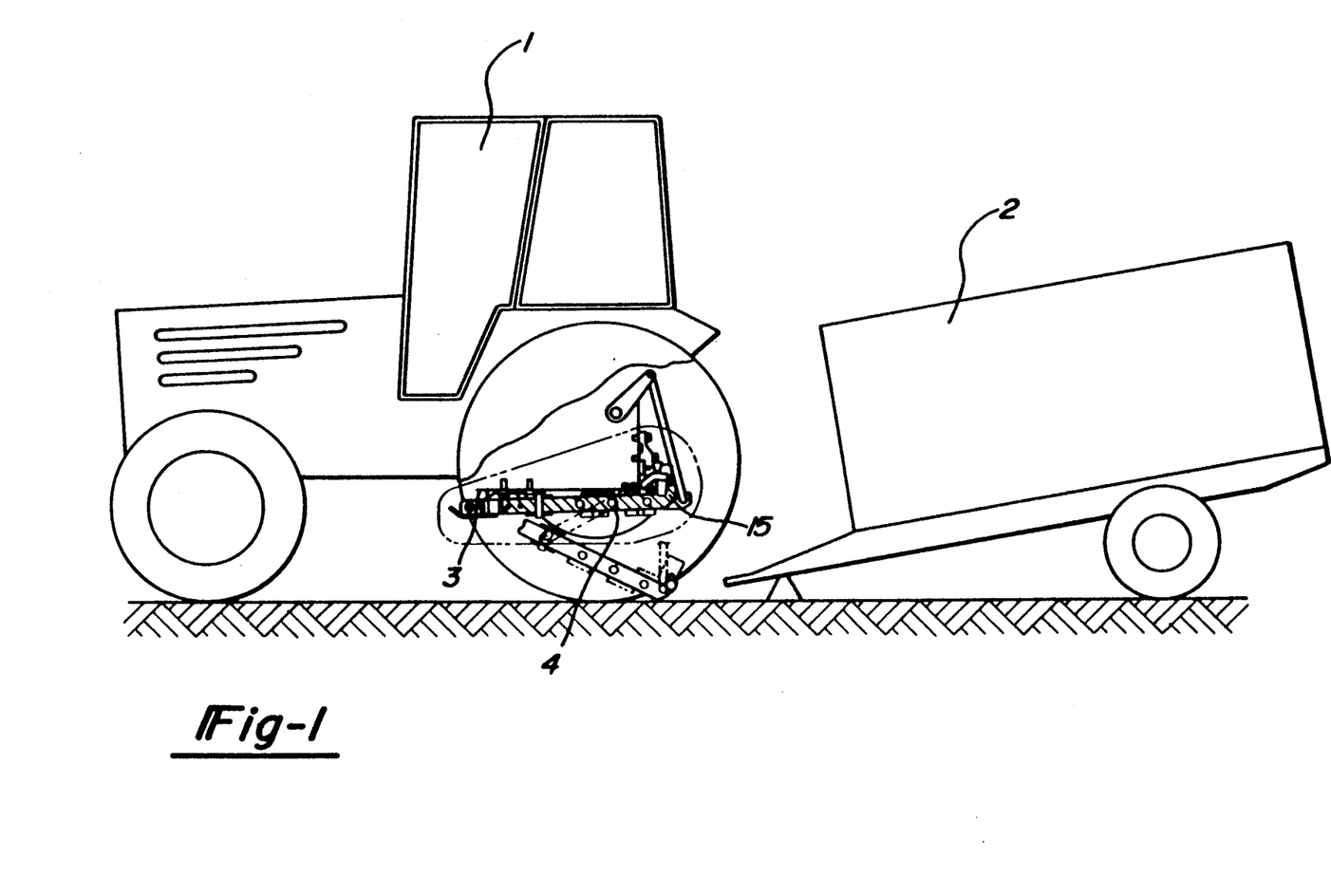
FIG. 1 illustrates a side elevation view of a tractor partially in cross section with a first embodiment of a coupling device in accordance with the invention.

The tractor 1 shown in FIG. 1 is fitted on its rear underside 3 with a frame 4 including a coupling device constructed in accordance with the present invention. From the frame 4 a coupling member 15 extends rearwardly of the tractor 1. The coupling member 15 may be raised and lowered towards the ground by means of a power drive. For example, the coupling may be raised and lowered by the principal lifting drive of the tractor 1. The coupling member 15 is adapted to be connected to a corresponding coupling member of the towed implement 2 or trailer The coupling device 15 is shown on an enlarged scale in the other drawing figures.

In the device shown in FIGS. 2 to 5 the frame 4 includes two longitudinal struts 5 mounted on the tractor 1 parallel to the longitudinal axis. The struts 5 ar pivotally mounted with the tractor 1 at their forward ends by bearing blocks 6. Each bearing block 6 has a base plate 7 which is adapted to be secured to the rear underside 3 of the tractor 1 by screws, bolts or the like extending through bolt holes 8. Each bearing block 6 further includes downwardly projecting pairs of two brackets. The brackets have bearing bores 9 to receive bearing bolts 11. A longitudinal strut 5 is disposed between each of the two brackets and has a corresponding bearing bore 10. Each bearing block 6 and longitudinal strut 5 are connected together in an articulated manner via bearing bolts 11 inserted into bores 9, 10 The two longitudinal struts 5, which are disposed parallel to one another, are firmly joined to one another adjacent the rearward ends of the struts 5 by an upper transverse brace 12 and a lower transverse brace 13. The two braces 12, 13, are welded to the struts 5 and a drawbar 14 is guided between the two braces 12 and 13.

As shown in FIGS. 2 to 5 the drawbar 14 has a first coupling member 15 disposed at its rearward end and extending away from the rear of the tractor. Coupling member 15 is shaped as a draw hook. At its other end, the drawbar 14 has a second coupling member 16 in the form of a draw bit. The bit is offset by 90° in relation to the first coupling member 15 about the longitudinal axis of the drawbar 14. The drawbar 14 is also provided with a connecting bore 17. The drawbar 14 is pivotally mounted on a slide 18 about a connecting pin 22 inserted in bores 21 providing a vertical axis of rotation. The slide 18 includes guide pegs 19 adjacent the struts 5. The pegs 19 are guided so that they move longitudinally, e.g. along the longitudinal axis of the tractor in guideways 20 which extend along part of the length of the two longitudinal struts 5 on their inner opposed surfaces. The guide pegs 19 also extend through guide rod bores 24 provided in guide rods 23 which are disposed parallel to the longitudinal struts 5. The other ends of the guide rods 23 also have bearing bores 28. Bearing pins 29 pass through bores 28 to mount the rods 23 to a swivel bearing 25 through bearing bores 27. The bearing bores 27 are located in holders which project downwardly from the underside 3 of the tractor away from a bearing plate 26. Two of these holders guide one of the guide rods 23 between them. The swivel bearing plate 26 is firmly secured, as by bolting, to the rear underside 3 of the tractor.

A fixed bearing 30 is further disposed between the two longitudinal struts 5. The bearing 30 includes an upper and a lower guide plate 31, 31a. The upper guide plate 31 extends laterally over part of the distance between the two longitudinal struts 5 so that a lateral guideway area 33 is formed for the guide rods 23. The two guide plates 31, 31a are provided with a connecting bore 32 which enables adjustment of the fastening of the drawbar 14. The drawbar 14 includes abutment members fitted on its end adjacent to the first coupling member 15.

The abutment members include centering pieces 34 having centering faces 35 which converge towards one another in the direction of the front end of the tractor 1. The centering pieces 34 may be secured to the drawbar 14 by means of a connecting pin 36. Stop blocks 37, which are provided with stop surfaces 38 opposite to the centering surfaces 35, are fixed by means of fastening screws 39 on to the two longitudinal struts 5. The blocks 37 project with interposed securing brackets 40. The brackets 40 form part of a locking mechanism 41. The stop faces 38 and centering faces 35 laterally align the drawbar 14.

Figure 2:
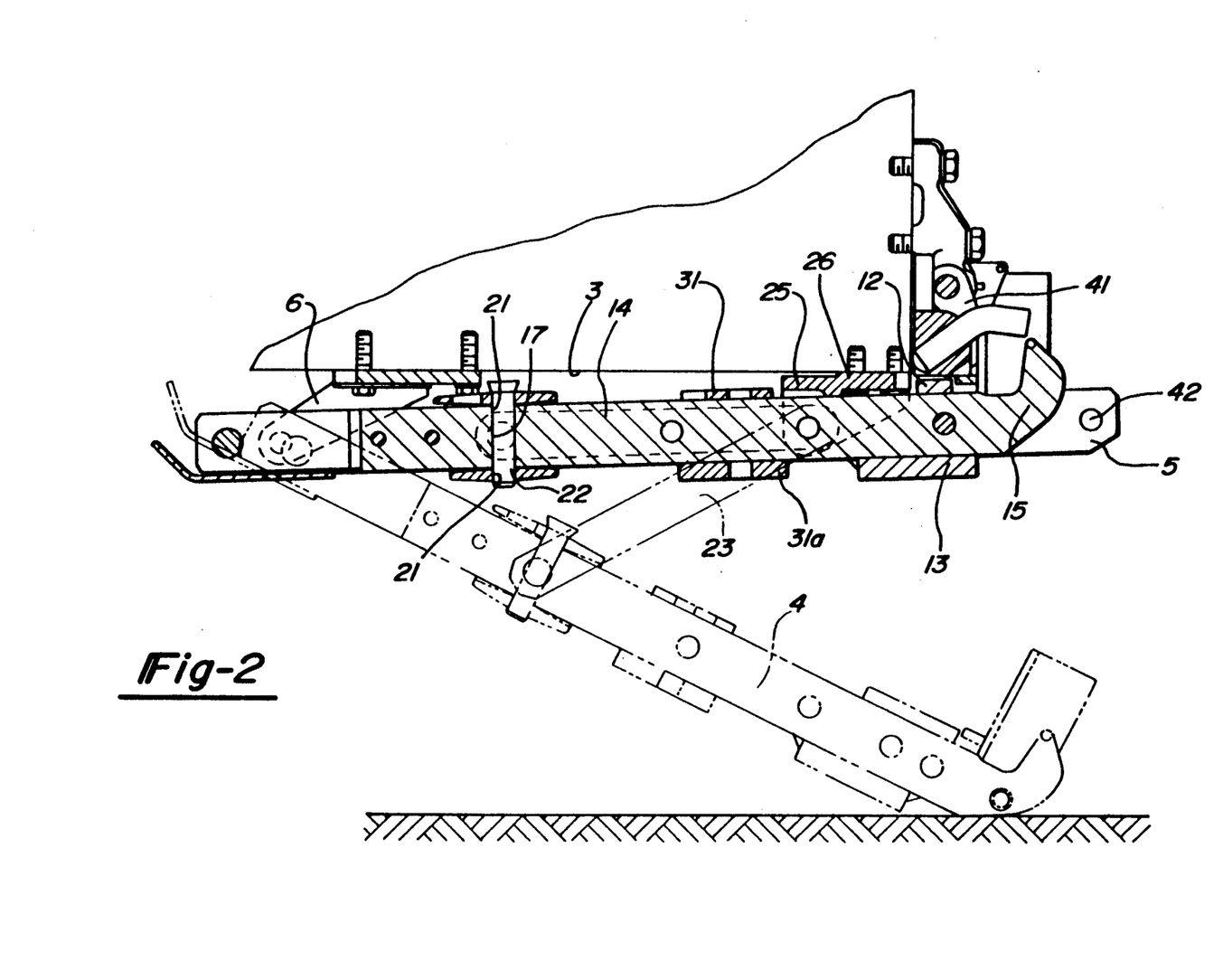
FIG. 2 is a longitudinal section view of FIG. 3 along line 2—2 thereof in both the upper towing position and the lower coupling position.
Figure 3:
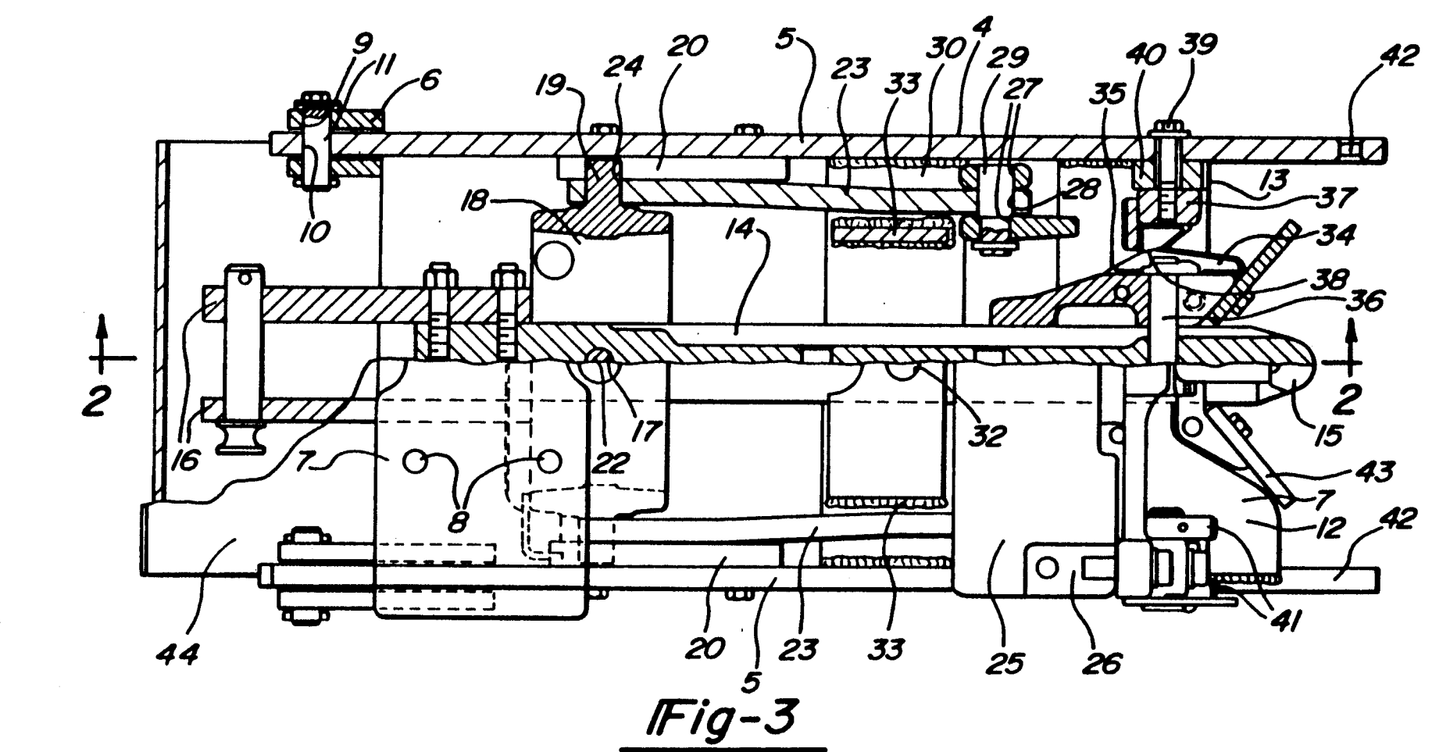
FIG. 3 is a plan view of FIG. 2 in half section according to the section line 3—3 of FIG. 2.
Figure 4:
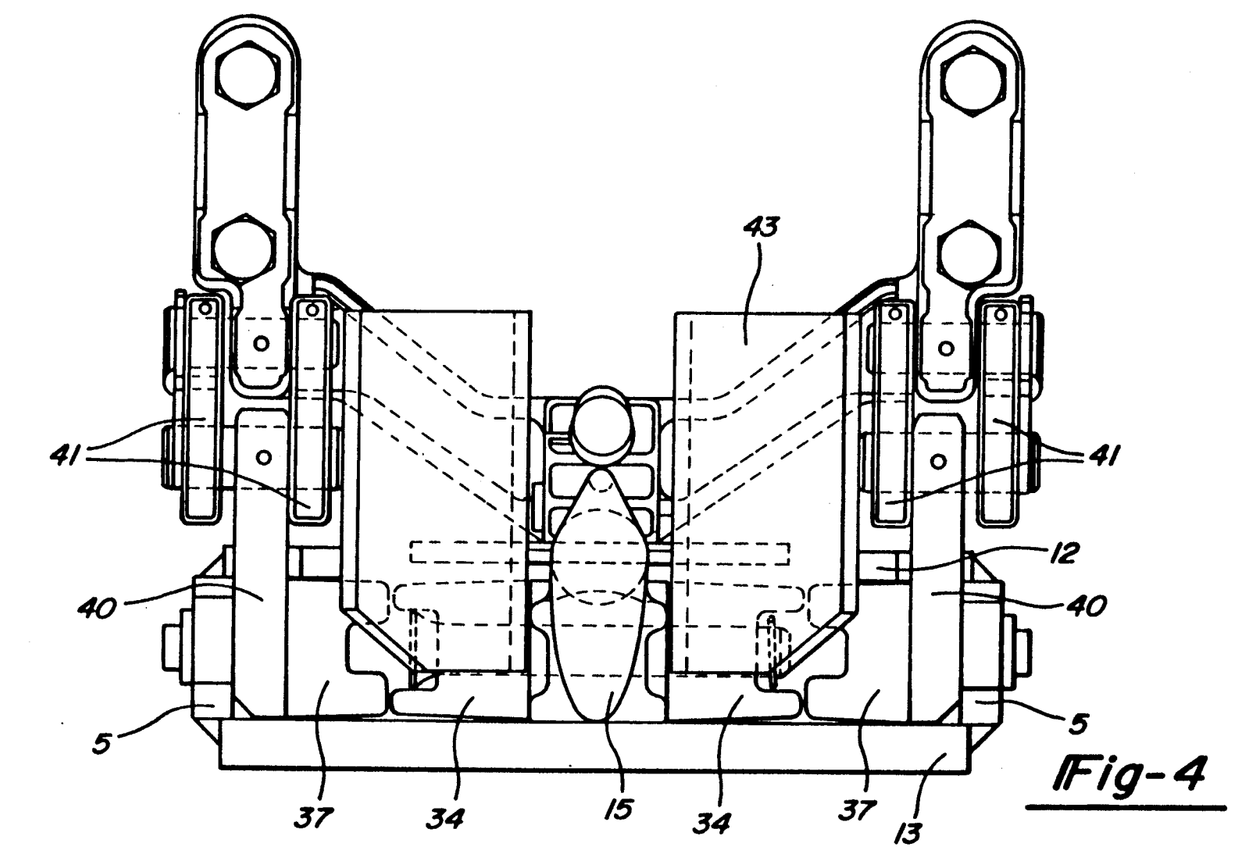
FIG. 4 is a rear elevation view of the device in the raised and locked position.
Figure 5:
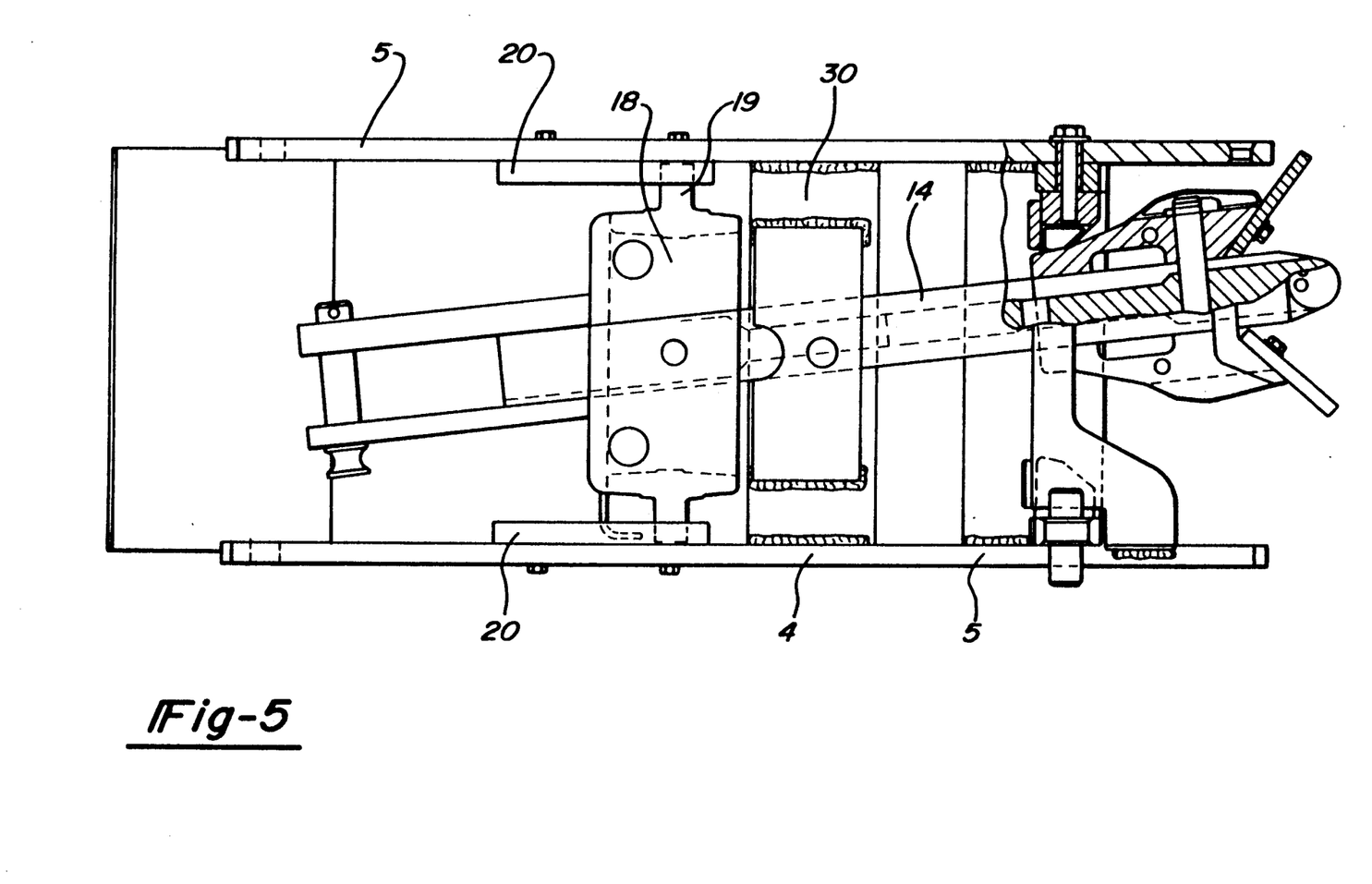
FIG. 5 is a plan elevation view partially in section of the parts forming the coupling framework, with the coupling framework in a lowered position with the drawbar swivelled laterally.

In the example of the arrangement shown in solid lines in FIGS. 2 and 3 the coupling device is in the towing position e.g. with the coupling and drawbar of the towed implement 2 in the raised position. The drawbar 14 is secured against sideways movements and is held between the two longitudinal struts 5 by the centering means. Rearwardly extending extension fins 43, on the ends of the centering pieces 34, laterally align the drawbar 14 when the frame 4 is raised upwardly from the broken line position in FIG. 2. The frame 4 is also fitted with a guard plate 44 on its end facing towards the front end of the tractor. Both longitudinal struts 5 are fitted with connection bores 42 to which a power drive may be connected in order to lower and raise the frame 4.

In the towing position, that is the raised position, the frame 4 is fixed relative to the tractor 1 by a locking mechanism. When the frame 4 is tilted out of the unbroken line upper position shown in FIG. 2 into the downwards tilted position shown by broken lines, the slide 18 moves rearwardly in the guideways 20 in relation to the longitudinal struts 5. The movement is due to the arrangement of the guide rods 23 connected between the swivel bearing 25 adjacent to the rear of the tractor and the arrangement of the slide which is displaced forwardly of the swivel bearing 25. At the same time, the position of the first coupling member 15 with regard to its distance from the tail of the tractor remains essentially unchanged, as shown in FIG. 2.

The centering pieces 34 are displaced from the lateral guideway through the stop blocks 37 and ca be swivelled about the connecting pin 22 sideways towards one of the two longitudinal struts 5 in order to facilitate coupling. When the frame 4 is raised by the power drive (not shown) the slide 18 is displaced along the guideways 20 and thus the drawbar 14 is similarly displaced towards the front end of the tractor. As this occurs, the centering faces 35 of the centering pieces 34 engage the stop faces 38 and with continuing movement are centered until they are fixed against lateral movement. The locking mechanism 41 covers the sides of the first coupling member 15 and thus secures the coupling member of the towed implement or trailer in the attached position.

Figure 6:
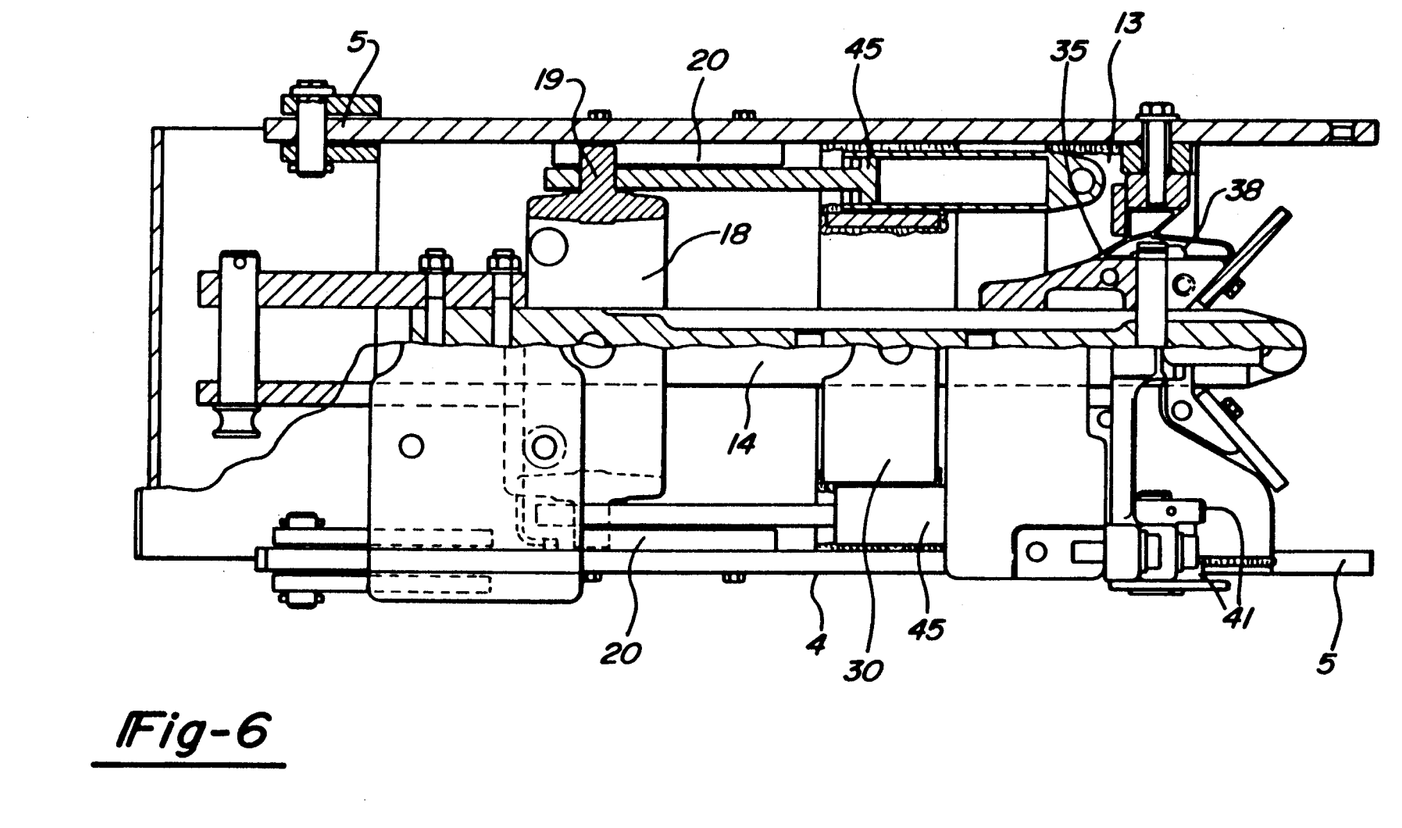
FIG. 6 is a view like FIG. 3 of another embodiment of the present invention.

A modified embodiment of means for operating the slide 18 described with reference to FIGS. 1 to 5 is shown in FIG. 6. Instead of the slide 18 being operated via the two guide rods, power drives 45 replace the two guide rods. The power drives 45 may include fluid pressure actuated piston and cylinder devices. The piston rods are connected to the guide pegs 19 while their cylinders are connected to the two braces 12, 13. The power drives 45 can be operated independently of the lifting movement of the frame 4. Retraction of the drawbar 14 through the action of the power drives 45 occurs as the frame 4 moves towards its upper position. As this movement occurs, the centering surface 35 and stop surface 38 engage one another laterally aligning the drawbar 14.

Figure 7:
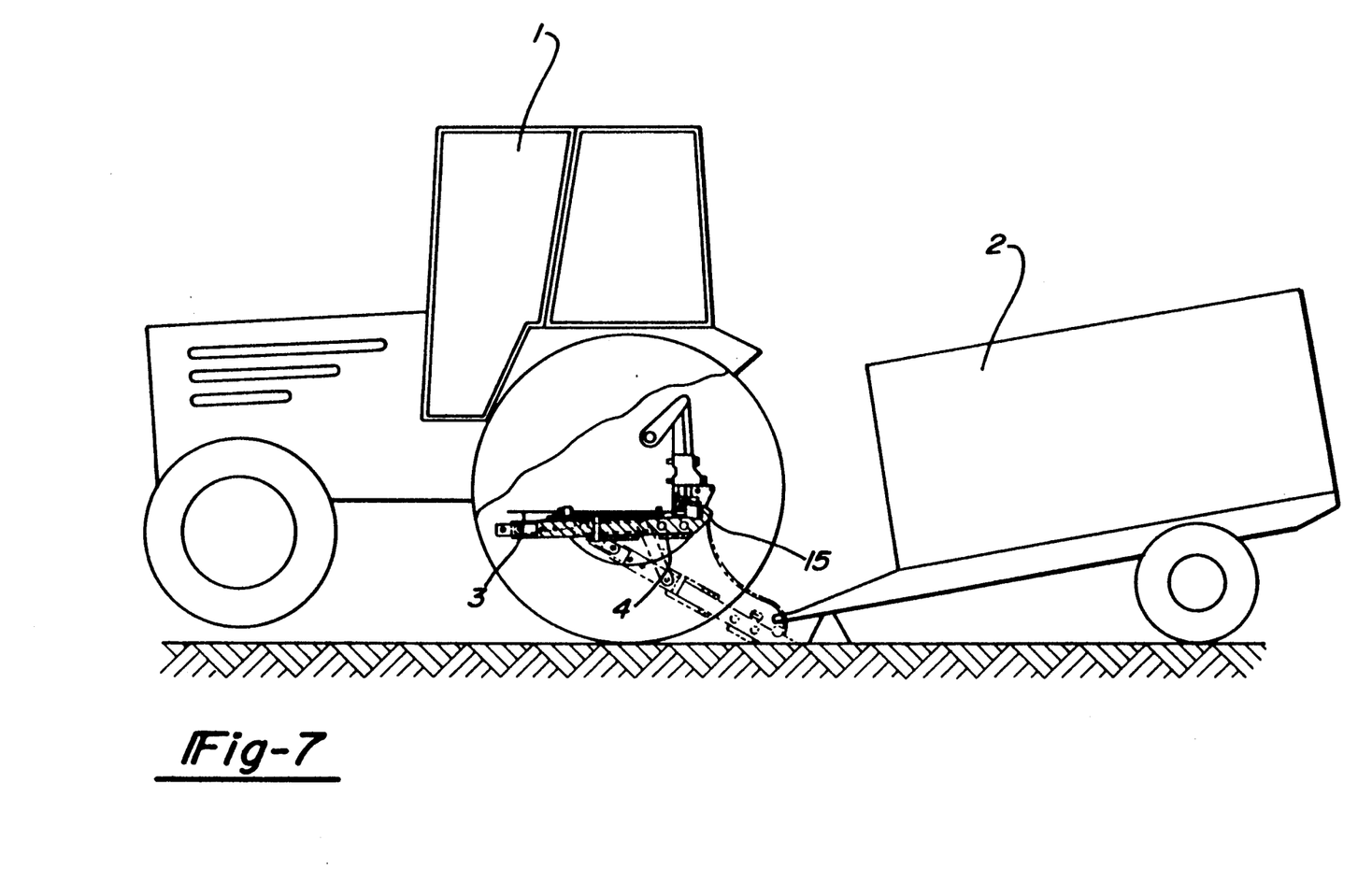
FIG. 7 is a view like FIG. 1 of a tractor with another embodiment of the present invention.
Figure 8:
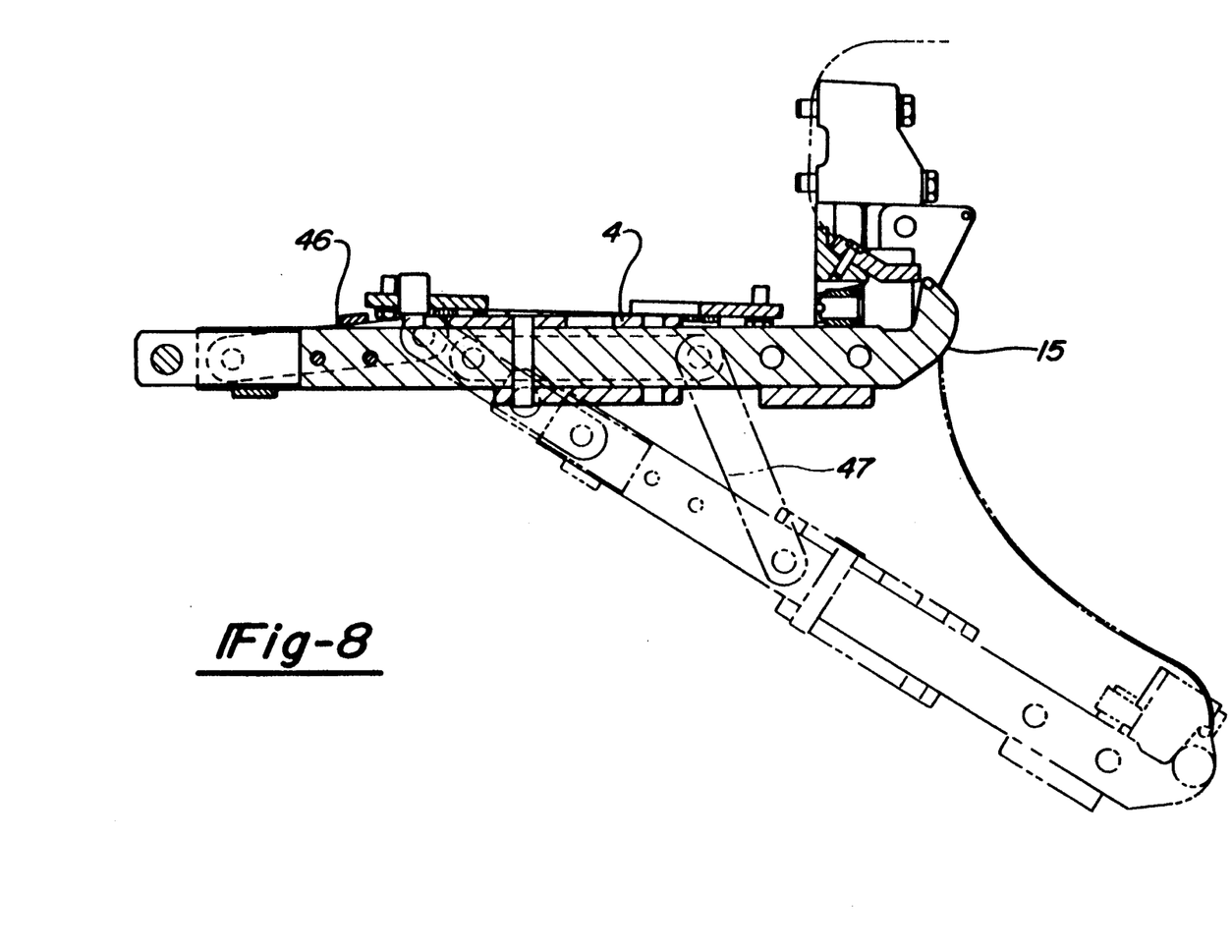
FIG. 8 is an enlarged cross section view of the coupling device shown in FIG. 7.

Another embodiment of the coupling device is shown in FIGS. 7 and 8. Basically, the only substantial difference compared with the embodiment of the coupling device shown in FIGS. 1 to 6 is that frame 4 is mounted so that it can swivel via a total of four guide rods 46, 47 on to the underside 3 of the tail of the tractor 1. Two front guide rods 46 and rear guide rods 47 are mounted on the frame 4 intermediate its ends. The rods are connected in an articulated manner to the frame 4 and to a cooperating bracket which is fixed on to the underside 3 of the tail. The guide rods 47 extend towards the rear of the tractor and are designed to be longer than the guide rods 46, which extend towards the front end of the tractor 1. When the frame 4 is lowered, the coupling member 15 follows a curved path as shown in FIG. 8 by the broken lines. Thus, upon lowering the coupling member 15, it is displaced towards the to be attached implement 2. The means for centering or additionally adjusting the drawbar 14 are the same as those explained with reference to FIGS. 1 to 6.

Figure 9:
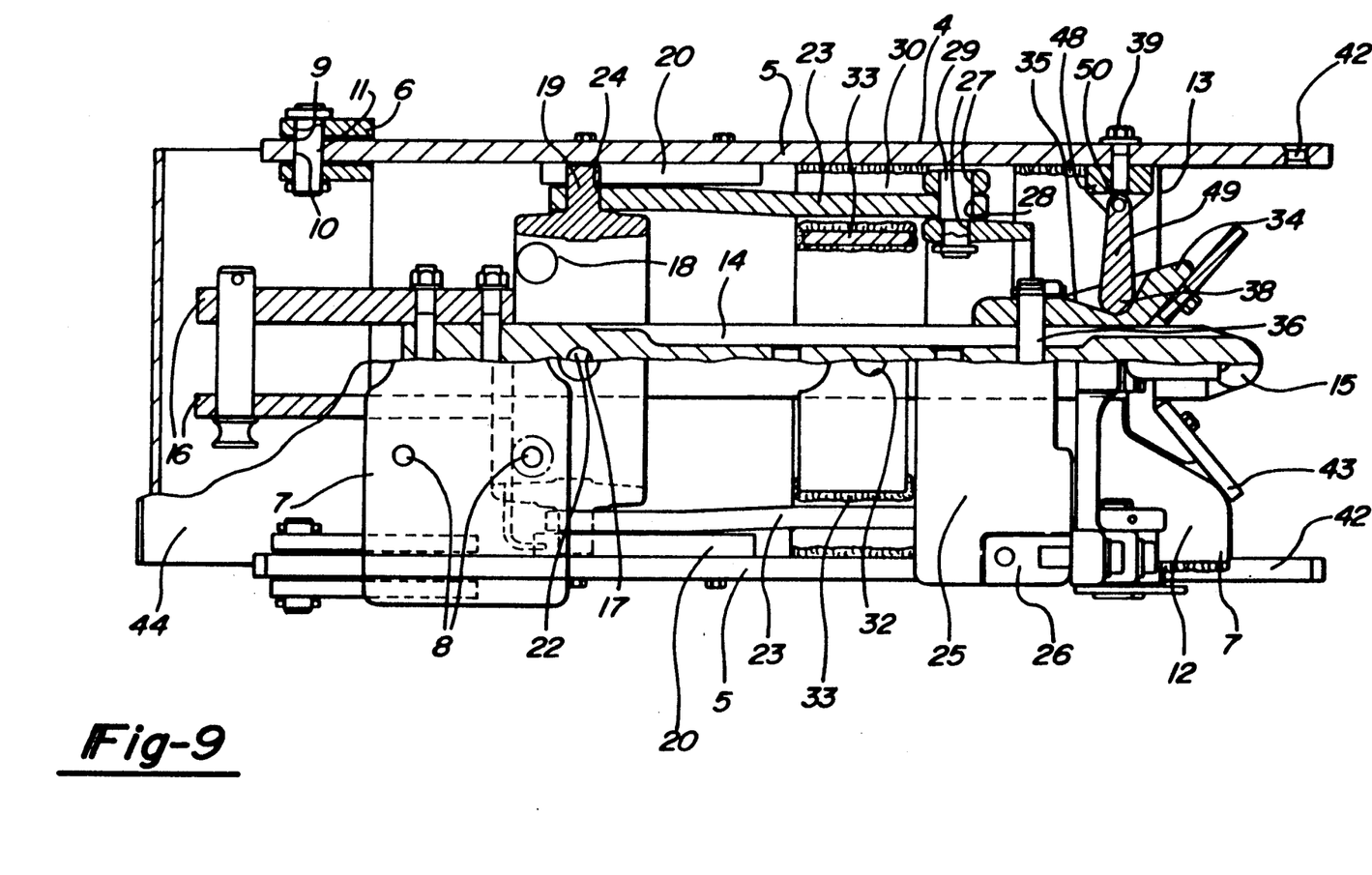
FIG. 9 is a view like FIG. 5 of another embodiment of the present invention.

FIG. 9 illustrates another embodiment of the centering mechanism. Holders 48 are mounted on the respective two longitudinal struts 5 of the frame 4. Centering levers 49 are pivotably mounted about a pivot axis 50 on the holders 40. Two centering levers 49 are disposed on both sides of the drawbar 14 and have butting surfaces 38 on their free ends which cooperate with centering faces 35 of the centering piece 34 fixed on to the drawbar 14. The centering surfaces 35 form part of the recesses in the centering piece 34. When the frame 4 is raised, the drawbar is displaced as described with reference to FIGS. 2 to 5. When the drawbar 14 is retracted, the centering levers 49 move from their position in which they are at an angle projecting towards the rear of the tractor into the position shown in FIG. 9. In FIG. 9, the levers 49 extend substantially at right angles to the longitudinal struts 5. The drawbar 4 is thus centrally aligned.

Figure 10:
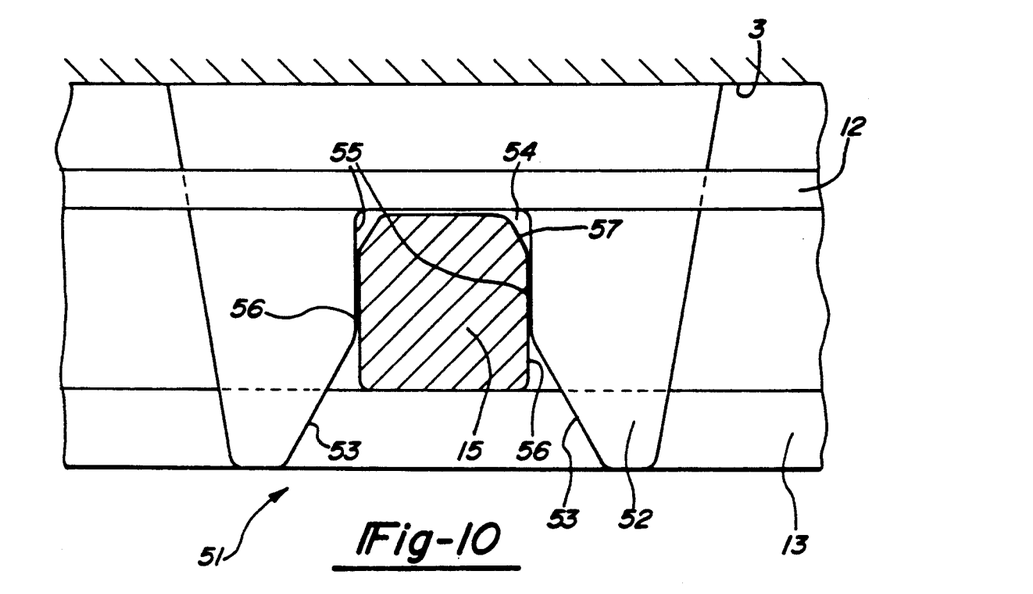
FIG. 10 is a sectional view of FIG. 9 through line 10—10 thereof.

In the embodiment shown in FIG. 10, only the centering device 51 is shown in detail wherein the drawbar 14 is aligned directly by a centering yoke or fork 52 secured to the underside 3 of the rear of the tractor 1. The centering fork 52 has a recess 54. The base of the recess corresponds to the cross section of the drawbar 14. Centering faces 53 extend obliquely outward of the recess and form the receiving area for the drawbar 14. The drawbar may be provided with corresponding sloping surfaces 57 which facilitate the receiving or aligning of the drawbar with respect to the recess 54. In the locked towing position of the drawbar 14, shown in FIG. 10, its side faces 56 are restrained against lateral movement relative to the side faces of the recess 54.

Figure 11:
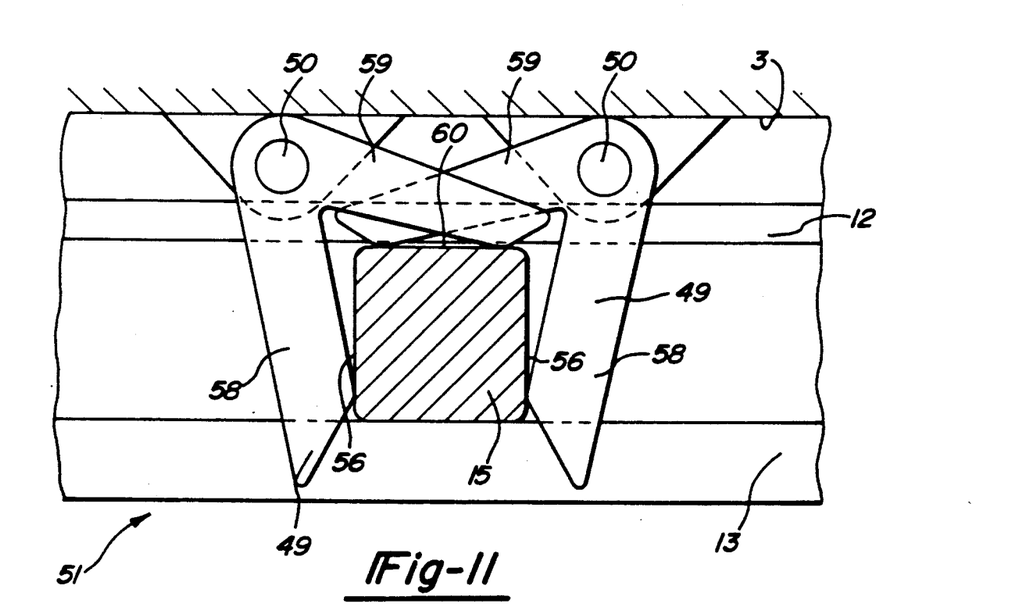
FIG. 11 is a view like FIG. 10 of another embodiment of the invention.

A further embodiment of the centering device 51 is shown in FIG. 11 with two angle shaped centering levers 49. The two centering levers 49 are firmly attached, via a bearing block, onto the rear underside 3 of the tractor. The levers 49 pivot about a pivot axis which lies at the point of intersection of the two lever arms 58, 59. The two first lever arms 58 extend essentially downwards from the rear underside 3, while the two other lever arms 59 are angled towards one another. When the drawbar 14 is raised, it moves upwardly into the recess formed between the two first lever arms 58 of the two centering levers 49 until its upper surface 60 abuts the two second lever arms 59. When the drawbar moves further up towards the underside 3 of the tail, the two centering levers 49 are swung horizontally, until the two first lever arms 58 rest on the side faces 56 of the drawbar 14 to bring it into alignment and secure it in its aligned position against lateral displacement.

Figure 12:
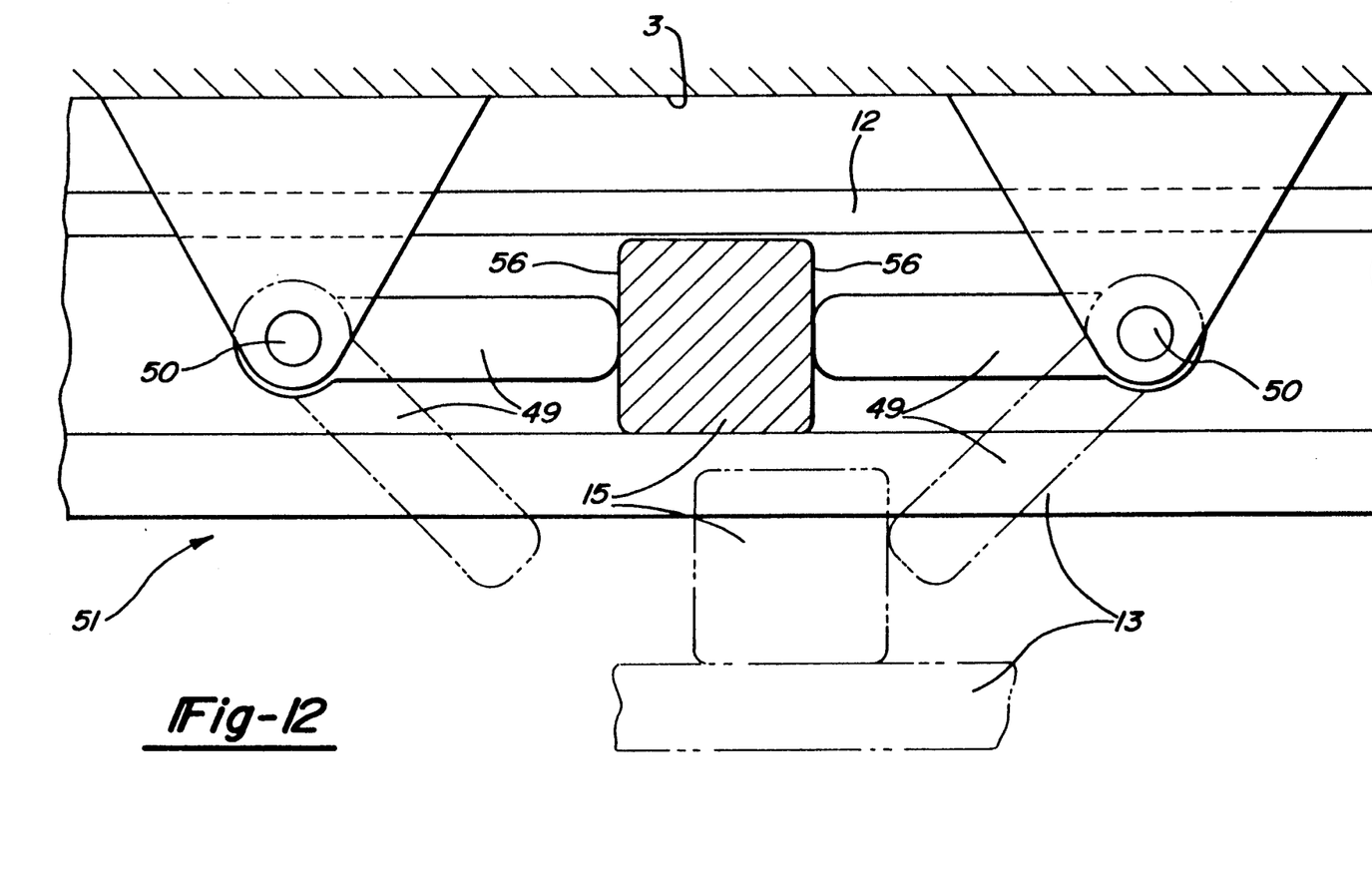
FIG. 12 is a view like FIG. 10 of another embodiment of the invention.
Figure 13:
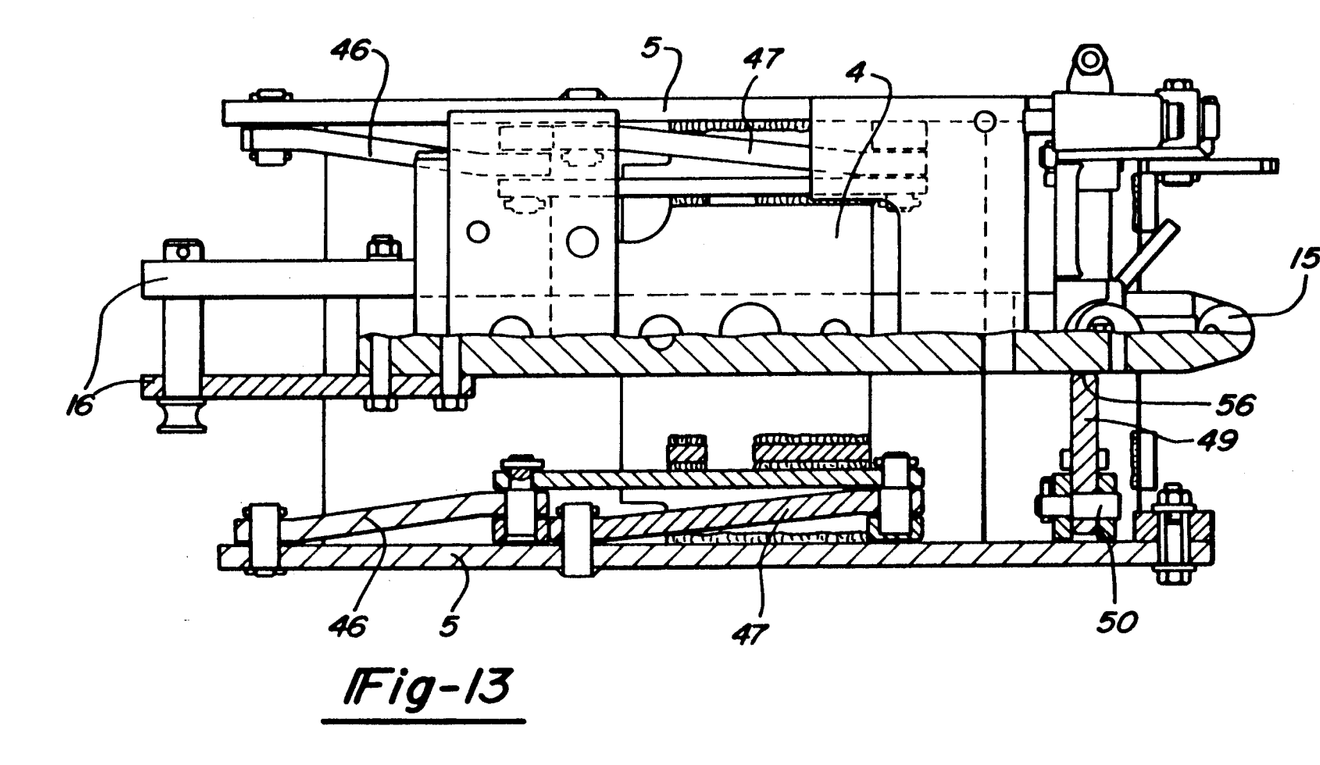
FIG. 13 is a view like FIG. 3, for an embodiment of the centering means in accordance with FIG. 12.

FIGS. 12 and 13 illustrate a further embodiment of the centering device 51. Two centering levers 49 are laterally spaced apart relative to one another. The levers point towards each other in the swung-in position to the center hold the drawbar 14. To swing the two centering levers 49 horizontally into the positions shown in unbroken lines, the raising of the frame 4 is utilized with the bottom brace 13 of the frame 4 coming into abutment with the free ends of the centering levers 49. If raising continues, the centering levers 49 rest on the side faces 56 of the drawbar and push it into its centered position.

It is preferable for the centering levers 4 to be biased for example by a leaf spring in the swung-out position shown in dot-dash lines in FIG. 12. The two centering levers 49 are also pivotally secured, via bearing blocks, on the rear underside 3 of the tractor. The pivot axes 50 extend horizontal and parallel to the longitudinal axis of the tractor.

While the above detailed description describes the preferred embodiment of the present invention, the invention is susceptible to modification, variation, and alteration without deviating from the scope and fair meaning of the subjoined claims.

We claim:

1. A coupling device mountable on a tractor for releasably connecting a towable member to the tractor, the coupling device comprising:
    a drawbar movable, in use, relative to the tractor on which the coupling device is mounted, said drawbar movable between a lower inoperative position, in which a towable member is connectable to and disconnectable from said drawbar, and an upper operative position, in which the towable member is towable by the tractor;
    centering means for prohibiting lateral movement of said drawbar, said centering means including abutment members engageable with one another to center the drawbar relative to said coupling device when the drawbar is in said upper operative position, said abutment members being disengaged from contact with one another when the drawbar is in its said lower inoperative position; and
    framework mountable on the tractor for movement between said upper and lower positions, said framework including a pair of struts, said drawbar being mounted on said framework, positioned between said struts and being movable relative thereto, and said abutment members are on said drawbar.

2. A coupling device according to claim 1 wherein said abutment members are movable into engagement with one another by the action of moving the drawbar from its said lower inoperative position into its upper operative position.

3. A coupling device according to claim 1 wherein power actuating means move said abutment members into engagement with one another.

4. A coupling device according to claim 1 wherein said abutment members are on attachments securable to a fixed part of the tractor.

5. A coupling device according to claim 1 wherein the drawbar has one or more abutment faces for engagement with one or more respective cooperating abutment faces on said framework for laterally aligning said drawbar relative to said framework in said upper operative position.

6. A coupling device according to claim 1 wherein said drawbar is pivotally mounted on slide means on said framework, said drawbar is slidable with respect to the framework and pivotable laterally about a vertical axis.

7. A coupling device according to claim 1 wherein said framework is pivotally mountable about a horizontal axis to the rear underside of the tractor at that end of the framework remote from the member which is to be towed.

8. A coupling device according to claim 1 wherein said framework is mountable on the tractor via a plurality of links of different lengths.

9. A coupling device according to claim 6 wherein said slide means is connected by a plurality of links to a swivel bearing which is in a fixed relationship relative to the tractor.

10. A coupling device according to claim 5 wherein said one or more abutment faces on said drawbar are on respective abutment members detachably securable to said drawbar.

11. A coupling device according to claim 9 wherein the distance between said swivel bearing and the rearward extremity of the drawbar is less than the distance between the extremity and the slide means, and said slide means is disposed rearwardly of the position at which said framework is mountable to the tractor.

12. A coupling device according to claim 5 wherein at least two of said abutment faces are provided on the drawbar and said faces are convergent towards one another in a direction towards the front of the tractor.

13. A coupling device according to claim 1 wherein said framework is lockable relative to the tractor in said upper position.

14. A coupling device according to claim 1 wherein each end of the drawbar is provided with a differing coupling member each of which is circumferentially offset relative to the other about the longitudinal axis of the drawbar, the cross-sectional dimension of each said coupling member being less than the cross-sectional dimension of the framework.

15. A coupling device according to claim 10 wherein each of said abutment members includes an extension fin.

16. A coupling device according to claim 6 wherein power actuating means moves said slide means.

17. A coupling device according to claim 4 wherein said abutment members on said attachments include pivotable levers engageable with the abutment members on said drawbar.

18. A coupling device according to claim 4 wherein said abutment members on said attachments include centering faces on a centering fork with a recess for receiving said drawbar.

19. A coupling device according to claim 4 wherein said framework is moveable between said upper and lower positions by power actuating means.

* * * * *

UNITED STATES PATENT AND TRADEMARK OFFICE
CERTIFICATE OF CORRECTION

PATENT NO. : 5,263,734
DATED : November 23, 1993
INVENTOR(S) : Herbert Coenen et al It is certified that error appears in the above-indentified patent and that said Letters Patent is hereby corrected as shown below:

Column 4, line 14, after "trailer", insert --.--.

Column 4, line 18, "ar" should be --are--.

Column 4, line 30, after "10", insert --.--.

Column 5, line 50, "ca" should be --can--.

Column 7, line 25, "4" should be --49--.

Signed and Sealed this

Twenty-eighth Day of June, 1994

Attest:

BRUCE LEHMAN

*Attesting Officer*  *Commissioner of Patents and Trademarks*